(12) United States Patent
Sedlacek et al.

(10) Patent No.: US 11,368,254 B2
(45) Date of Patent: Jun. 21, 2022

(54) AVOIDING MULTIPLE RETRANSMISSIONS OF SIGNALLING TRANSPORTED BY 5G NAS TRANSPORT

(71) Applicant: Telefonaktiebolaget LM Ericsson (publ), Stockholm (SE)

(72) Inventors: Ivo Sedlacek, Hovorcovice (CZ); Kaj Johansson, Gothenburg (SE); Mikael Wass, Sätila (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 16/756,209

(22) PCT Filed: Oct. 16, 2018

(86) PCT No.: PCT/EP2018/078306
§ 371 (c)(1),
(2) Date: Apr. 15, 2020

(87) PCT Pub. No.: WO2019/076936
PCT Pub. Date: Apr. 25, 2019

(65) Prior Publication Data
US 2021/0194634 A1 Jun. 24, 2021

Related U.S. Application Data

(60) Provisional application No. 62/572,699, filed on Oct. 16, 2017.

(51) Int. Cl.
*H04L 1/16* (2006.01)
*H04L 1/14* (2006.01)

(52) U.S. Cl.
CPC ................... *H04L 1/1671* (2013.01)

(58) Field of Classification Search
None
See application file for complete search history.

(56) References Cited

U.S. PATENT DOCUMENTS

| | | | |
|---|---|---|---|
| 2011/0085496 | A1 | 4/2011 | Zhang |
| 2012/0210185 | A1 | 8/2012 | Venkataraj |
| 2014/0241168 | A1 | 8/2014 | Merlin et al. |
| 2019/0223093 | A1* | 7/2019 | Watfa .................... H04W 48/18 |
| 2019/0261159 | A1* | 8/2019 | Wang .................... H04W 48/18 |
| 2020/0120585 | A1* | 4/2020 | Kumar .................... H04W 8/08 |
| 2020/0120751 | A1* | 4/2020 | Sugawara ............. H04W 80/10 |
| 2021/0092634 | A1* | 3/2021 | Kang ................ H04W 28/0247 |

OTHER PUBLICATIONS

3GPP TR 24.890 V1.0.3 (Sep. 2017) (Year: 2017).*
International Search Report and Written Opinion dated Jan. 23, 2019 issued in International Application No. PCT/EP2018/078306. (11 pages).

(Continued)

*Primary Examiner* — Jay L Vogel
(74) *Attorney, Agent, or Firm* — Rothwell, Figg, Ernst & Manbeck, P.C.

(57) ABSTRACT

Embodiments herein relate to a wireless device and an Access and Mobility Management Function, AMF, and methods performed by a wireless device and an AMF, respectively.

21 Claims, 13 Drawing Sheets

(56) References Cited

OTHER PUBLICATIONS

Figure 1:
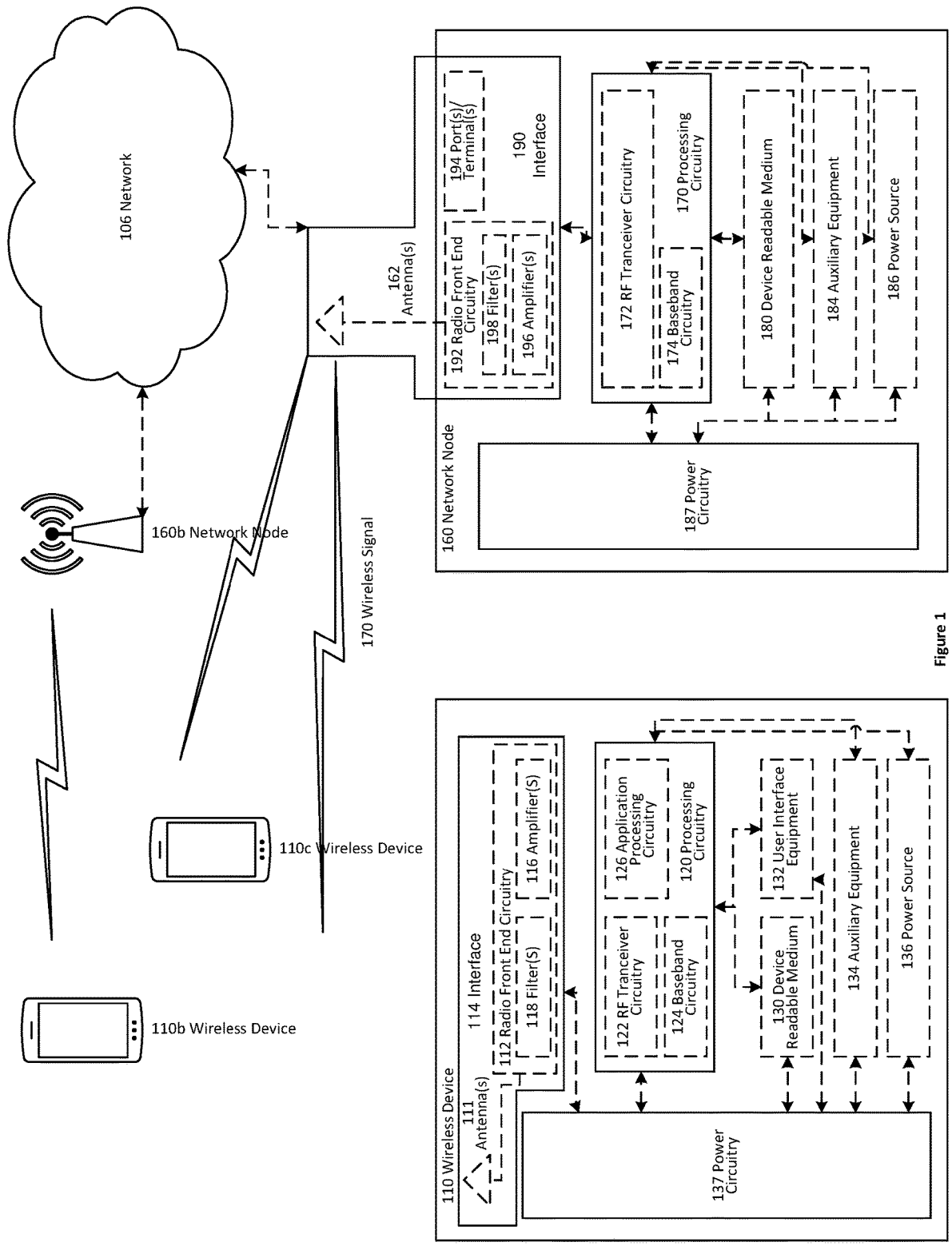

International Preliminary Report on Patentability dated Jan. 23, 2020 issued in International Application No. PCT/EP2018/078306. (17 pages).
3GPP TR 24.890 V1.0.3, 3rd Generation Partnership Project; Technical Specification Group Core Network and Terminals; 5G System—Phase 1; CT WG1 Aspects (Release 15) (Sep. 2017). (164 pages).
Qualcomm Incorporated et al., "TS 23.502: PDU sessions handling for LADNs" SA WG2 Meeting #121; S2-173111; May 15-19, 2017, Hangzhou, P.R. China, (29 pages).
Huawei et al., "TS23.,502: update to ATC related procedures", SA WG2 Meeting #122bis; S2-175649; Aug. 21-25, 2017, Sophia Antipolis, France. (8 pages).
3GPP TSG CT WG1, Presentation of Specification to TSG: 3GPP TR 24.890 V1 .0.0. on 5G System—Phase 1; CT WG1 Aspects 3GPP TSG CT WG1, 3GPP TSG CT Meeting #77, CP-172035, Sapporo, Japan, Sep. 2017 (2 pages).
3GPP TR 24.890 V1.0.0 3rd Generation Partnership Project; Technical Specification Group Core Network and Terminals; 5G System—Phase 1; CT WG1 Aspects (Release 15) Sep. 2017 (161 pages).
QUALCOMM Incorporated, "TS 23.502 Procedures for use of NAS Transport", SA WG2 Meeting #119, S2-170827, Croatia, Dubrovnik, Feb. 2017 (3 pages).
Huawei et al., "TS 23.502: Avoid storing PDU session state in AMF and update related procedures", SA WG2 Meeting #121, S2-173139, May 2017, Hangzhou, P. R. China (12 pages).
Huawei et al., "TS 23.502 SMF information context synchronization between old AMF and new AMF", SA WG2 Meeting #122B, S2-175643, Aug. 2017, Sophia Antipolis, France (17 pages).
Nokia et al., "Interim agreement on Routing of NAS signalling and on How the AMF can select the proper SMF instance for a PDU session", SA WG2 Meeting #118, S2-166351, Nov. 2016 (5 pages).

* cited by examiner

AVOIDING MULTIPLE RETRANSMISSIONS OF SIGNALLING TRANSPORTED BY 5G NAS TRANSPORT

CROSS REFERENCE TO RELATED APPLICATION(S)

This application is a 35 U.S.C. § 371 National Stage of International Patent Application No. PCT/EP2018/078306, filed Oct. 16, 2018, designating the United States and claiming priority to U.S. provisional application No. 62/572, 699, filed on Oct. 16, 2017. The above identified applications are incorporated by reference.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP TR 24.890 v1.0.3 (2017-09) "3rd Generation Partnership Project; Technical Specification Group Core Network and Terminals; 5G System—Phase 1; CT WG1 Aspects (Release 15) ("3GPP TR 24.890") is hereby incorporated by reference, and specifically clause 8.5.1 5GMM common procedures, and clause 9.4 5GS session management procedures.

There currently exist certain challenge(s). The current version of 3GPP TR 24.890 defines transport of 5GSM (5G session management) messages from a UE to a SMF via a AMF and back from the SMF to the UE via the AMF.

As explained in the current version of 3GPP TR 24.890, in order to transmit a 5GSM message, the UE sends an uplink (UL) session management (SM) MESSAGE TRANSPORT message comprising the 5GSM message, PDU session ID and other parameters (e.g. DNN) to an access mobility function (AMF).

Upon receiving the UL SM MESSAGE TRANSPORT message comprising the 5GSM message, PDU session ID, and other parameters from the UE, the AMF selects an SMF (if not selected already for the PDU session), based on the received UL SM MESSAGE TRANSPORT message, and forwards the 5GSM message to the selected SMF.

In some embodiments, the AMF may not be able to select a SMF for the received UL SM MESSAGE TRANSPORT message. For example, a data network name (DNN) provided by the UE along with the 5GSM message in the UL SM MESSAGE TRANSPORT message may not be authorized for the UE.

The current version of 3GPP TR 24.890 does not specify how the AMF informs the UE about a failure to select a SMF for the received UL SM MESSAGE TRANSPORT message.

Certain aspects of the present disclosure and their embodiments may provide solutions to these or other challenges.

In some embodiments, if the AMF cannot select a SMF based on a received transport message (e.g., UL SM MESSAGE TRANSPORT message) comprising a SM message (e.g., 5GSM message), the AMF may create a status message (e.g., 5GMM STATUS message) comprising the received transport message and an indication of a cause of failure to select a SMF for the SM message.

In some embodiments, the UE may receive the status message (e.g., 5GMM STATUS message) transmitted by the AMF. In some embodiments, the status message may comprise the transport message (e.g., UL SM MESSAGE TRANSPORT message). Based on the received status message, the UE may retrieve the SM message (e.g., 5GSM message) included in the transport message and unsuccessfully complete the session management transaction (e.g., 5GSM transaction) identified by a procedure transaction identity (PTI) information element (IE) included in the SM message.

There are, proposed herein, various embodiments which address one or more of the issues disclosed herein.

In some embodiments, a method implemented in a wireless device is provided. The method includes transmitting a transport message (e.g., UL SM Message Transport message) to an Access and Mobility Function (AMF), wherein the transport message comprises a SM message (e.g., 5GSM message); and receiving a status message (e.g., 5GMM Status message) transmitted by the AMF, wherein the status message comprises at least a portion of the transport message and an indication of non-delivery of the SM message. In some embodiments the indication of non-delivery is an indication of non-delivery to a SMF.

In some embodiments, a method implemented in an Access Mobility Management Function (AMF) is provided. The method includes receiving a transport message (e.g., UL SM Message Transport message) transmitted by a wireless device, wherein the transport message comprises a SM message (e.g., 5GSM message); determining whether the SM message can be forwarded to a SMF; as a result of determining that the SM message cannot be forwarded to a SMF, creating a status message (e.g., 5GMM Status message) comprising at least a portion of the transport message and an indication of non-delivery of the SM message to a SMF; and transmitting the status message to the wireless device. In some embodiments, the determining whether the SM message can be forwarded to a SMF is at least partly based on the transport message.

Certain embodiments may provide one or more of the following technical advantage(s).

The current disclosure allows the AMF to notify the UE regarding a failure by the AMF to forward 5GSM messages transmitted by the UE towards a SMF.

ADDITIONAL EXPLANATION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

As explained in the current version of 3GPP TR 24.890, in order to transmit a 5GSM message, the UE sends a transport message (e.g., uplink (UL) session management (SM) MESSAGE TRANSPORT message) comprising a session management (SM) message (e.g., 5GSM message), PDU session ID and other parameters (e.g. DNN) to an access mobility function (AMF).

Upon receiving the transport message comprising the SM message, PDU session ID, and other parameters from the UE, the AMF selects an SMF (if not selected already for the PDU session), based on the received transport message, and forwards the SM message to the selected SMF.

Clause 8.5.1.1.2.1.1.4 of 3GPP TR 24.890 explains abnormal cases on the network side regarding UE-initiated SM message transport procedures where the AMF may be unable to select a SMF based on the transport message.

In some embodiments, a first abnormal case may be where the AMF does not have a PDU session routing context for the PDU session ID of the transport message and the UE, the request type IE of the transport message is set to "initial request," and the AMF fails to select a SMF.

In some embodiments, a second abnormal case may be where the AMF does not have a PDU session routing context for the PDU session ID of the transport message and the UE, the request type IE of the transport message is set to "existing PDU session," and the user's subscription context obtained from a unified data management (UDM) does not contain an SMF ID corresponding to: (i) the DNN of the transport message, if the DNN is included in the transport message; or (ii) a default DNN, if the DNN is not included in the transport message. In these scenarios, the AMF may fail to select a SMF.

In some embodiments, another abnormal case may be where the UE does not provide a request type in the transport message. The AMF may be unable to select a SMF based on the transport message.

The current version of 3GPP TR 24.890 does not specify how the AMF informs the UE about the failure to select a SMF, as described, for instance, in the abnormal cases described above. Accordingly, the absence of any specification of such may result in determining that the failure is due to a permanent cause (e.g. the requested DNN is not authorized DNN for the UE) and the UE may retransmit the SM message in a new transport message to the AMF. Upon receipt of the new transport message, the AMF may need to repeat the same SMF selection only to result in the same failure to select a SMF.

In some embodiments, the SM transport procedures (clause 8.5.1.1.2.1) as described by 3GPP TR 24.890 may be improved as described in the present disclosure below.

In some embodiments, if the AMF is unable to forward the SM message (e.g., 5GSM message) of the transport message (e.g., UL SM MESSAGE TRANSPORT message), the AMF may create and send a status message (e.g., 5GMM STATUS message) to the UE. The status message may comprise a 5GMM message container IE containing the transport message, and a cause of failure to forward the SM message.

In some embodiments, if the UE receives the status message comprising the 5GMM message container IE containing the transport message containing the SM message, the 5GMM layer may inform the 5GSM layer about non-delivery of the SM message. Based on the notification about the non-delivery of the SM message, the 5GSM procedure may stop any retransmissions of the SM message and consider the 5GSM procedure as unsuccessfully completed.

In some embodiments, the AMF may create the status message based on a failure of the AMF to select a SMF as described above, for instance, in the first abnormal case. For example, the AMF may create the status message if the AMF does not have a PDU session routing context for the PDU session ID of the transport message and the UE, the request type IE of the transport message is set to "initial request," and the AMF fails to select a SMF. The AMF may set a 5GMM message container IE of the created status message to the U transport message, according to some embodiments. The AMF may set a cause IE of the created status message to a cause indicating a cause of failure to select a SMF. The AMF may send the created status message to the UE.

In some embodiments, the AMF may create the status message based on a failure of the AMF to select a SMF as described above, for instance, in the second abnormal case. For example, the AMF may create the status message if the AMF does not have a PDU session routing context for the PDU session ID of the transport message and the UE, the request type IE of the transport message is set to "existing PDU session," and the user's subscription context obtained from a unified data management (UDM) does not contain an SMF ID corresponding to the DNN of the transport message, if the DNN is included in the transport message. The AMF may set a 5GMM message container IE of the created status message to the transport message, according to some embodiments. The AMF may set a cause IE of the created status message to a cause indicating a cause of failure to select a SMF. The AMF may send the created status message to the UE.

As another example, the AMF may create the status message if the AMF does not have a PDU session routing context for the PDU session ID of the transport message and the UE, the request type IE of the transport message is set to "existing PDU session," and the user's subscription context obtained from a unified data management (UDM) does not contain an SMF ID corresponding to a default DNN, if the DNN is not included in the transport message. The AMF may set a 5GMM message container IE of the created status message to the transport message, according to some embodiments. The AMF may set a cause IE of the created status message to a cause indicating a cause of failure to select a SMF. The AMF may send the created status message to the UE.

In some embodiments, the AMF may create the status message based on a failure of the AMF to select a SMF when the AMF does not have a PDU session routing context for the PDU session ID of the transport message and the UE, and the request type IE of the transport message is not provided. The AMF may set a 5GMM message container IE of the created status message to the transport message, according to some embodiments. The AMF may set a cause IE of the created status message to a cause indicating a cause of failure to select a SMF. The AMF may send the created status message to the UE.

In some embodiments, clause 8.5.1.1.2.1.1 of 3GPP TR 24.890 may be improved to describe embodiments where a UE-initiated SM message transport initiation is not accepted by the network.

The UE may receive the status message (e.g., 5GMM STATUS message) transmitted by the AMF described above, according to some embodiments. Upon reception of the status message with the 5GMM message container IE containing the transport message (e.g., UL SM MESSAGE TRANSPORT message), the UE may pass a non-delivery indication along with the SM message (e.g., 5GSM message) of the transport message to the 5GSM procedures specified in clause 9 of 3GPP TR 24.890. Specifically, the mobility management layer of the UE may pass the non-delivery indication along with the SM message to the session management protocol layer of the UE to notify that the SM message could not be forwarded by the AMF.

In some embodiments, the 5GS session management procedures (clause 9.4) as described by 3GPP TR 24.890 may be improved as described in the present disclosure below.

Clause 9.4.2.5 of 3GPP TR 24.890 describes abnormal cases in the UE in UE-requested PDU session establishment procedures. In some embodiments, the session management protocol layer of the UE may receive a non-delivery indication from the mobility management layer of the UE along with a session establishment request message (e.g., PDU SESSION ESTABLISHMENT REQUEST message) with PTI IE set to the allocated PTI value. In some embodiments, the non-delivery indication may be a UE internal indication triggered by the UE receiving the status message (e.g., 5GMM STATUS message) transmitted by the AMF. Upon receipt of the non-delivery indication along with the session establishment request message with the PTI IE set to the allocated PTI value, the UE may stop a timer (e.g, Tx), release the allocated PTI value and consider that the PDU session is not established.

Clause 9.4.4.5 of 3GPP TR 24.890 describes abnormal cases in the UE in UE-requested PDU session modification procedures. In some embodiments, the session management protocol layer of the UE may receive a non-delivery indication from the mobility management layer of the UE along with a session modification request message (e.g., PDU SESSION MODIFICATION REQUEST message) with a PTI IE set to the allocated PTI value. In some embodiments, the non-delivery indication may be a UE internal indication triggered by the UE receiving the status message (e.g., 5GMM STATUS message) transmitted by the AMF. Upon receipt of the non-delivery indication along with the session modification request message with the PTI IE set to the allocated PTI value, the UE may stop a timer (e.g., Tk), release the allocated PTI value and consider that the PDU session is not modified.

Clause 9.4.6.5 of 3GPP TR 24.890 describes abnormal cases in the UE in UE-requested PDU session release procedures. In some embodiments, the session management protocol layer of the UE may receive a non-delivery indication along with a session release request message (e.g., PDU SESSION RELEASE REQUEST message) with a PTI IE set to the allocated PTI value. In some embodiments, the non-delivery indication may be a UE internal indication triggered by the UE receiving the status message (e.g., 5GMM STATUS message) transmitted by the AMF. Upon receipt of the non-delivery indication along with the session release request message with the PTI IE set to the allocated PTI value, the UE may stop a timer (e.g., Tz), release the allocated PTI value and consider that the PDU session is not released.

In some embodiments, alternative improvements to 3GPP TR 24.890 may be provided as described by the present disclosure below.

Alternative (1): the UE-initiated NAS transport procedure may be extended with a transport accept message (e.g., UL SM MESSAGE TRANSPORT ACCEPT message) or a transport reject message (e.g., UL SM MESSAGE TRANSPORT REJECT message), which AMF sends upon reception and handling of a transport request message (e.g., UL SM MESSAGE TRANSPORT REQUEST message), according to some embodiments. Only up to one UE-initiated NAS transport procedure may be run at any given time. If the AMF is able to forward a SM message (e.g., 5GSM message) of the transport request message, the AMF may send the transport accept message. If the AMF is unable to forward the SM message of the transport request message, the AMF may send the transport reject message. In some embodiments, the transport request message may contain a cause of failure to forward the SM message of the transport request message cause. Accordingly, reliability may be provided on SM transport layer, and the 5GSM procedure will not need to retransmit the SM message. If transport of the SM message fails, the UE will receive the transport reject message and the 5GSM procedure will consider the 5GSM procedure as unsuccessfully completed.

In some embodiments, alternative (1) may require two NAS messages to transport the SM message while the existing procedure described in 3GPP TR 24.890 requires one NAS message.

Alternative (2): the AMF may be configured with a default SMF for rejection, according to some embodiments. The AMF may route any SM message (e.g., 5GSM message) which the AMF is unable to route forward to the default SMF for rejection. Accordingly, the default SMF may reject the SM message with an appropriate response message (e.g., 5GSM response message).

In some embodiments, alternative (2) requires deployment of an SMF. In some embodiments, the SMF may not have to be fully functional. For example, the SMF may only need to be able to reject the SM message from the UE.

Alternative (3): the AMF may do nothing and continue to receive retransmissions of the SM message (e.g., 5GSM message) from the UE when the AMF is not able to select an SMF for the SM message, according to some embodiments.

Although the subject matter described herein may be implemented in any appropriate type of system using any suitable components, the embodiments disclosed herein are described in relation to a wireless network, such as the example wireless network illustrated in FIG. QQ1. For simplicity, the wireless network of FIG. QQ1 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. QQ1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. QQ1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174.

In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. QQ2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. QQ2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. QQ2 is a UE, the components discussed herein are equally applicable to a WD, and vice-versa.

In FIG. QQ2, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. QQ2, or only a subset of the components. The level of integration between the components may vary from one UE to another UE. Further, certain UEs may contain multiple instances of a component, such as multiple processors, memories, transceivers, transmitters, receivers, etc.

In FIG. QQ2, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. QQ2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. QQ2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. QQ3 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

With reference to FIG. QQ4, a communication system in accordance with an embodiment is shown. The illustrated communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. QQ4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. QQ5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. QQ5 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. QQ5 and independently, the surrounding network topology may be that of FIG. QQ4.

In FIG. QQ5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments improve the handling of SM messages (e.g., 5GSM messages) transmitted by a UE when a AMF fails to forward a SM message transmitted by the UE to a SMF. Specifically, the teachings of these embodiments allow the AMF to notify the UE regarding the failure to forward the SM message to a SMF by creating a status message (5GMM STATUS message) comprising the SM message and transmitting the status message to the UE. Upon receipt of the status message, the UE determines that the AMF has failed to forward the SM message, thereby preventing the UE from sending the same SM message to the AMF which would result in the same failure.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. QQ6 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. QQ7 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. QQ8 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. QQ9 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. VV1 depicts a method VV100, in accordance with particular embodiments, that is performed by a wireless device. Method VV100 may begin at step VV102 in which the wireless device transmits a transport message (e.g., UL SM Message Transport message) to an Access and Mobility Function (AMF), wherein the transport message comprises a SM message (e.g., 5GSM message). In some embodiments, the transport message may further comprise at least one or more of: a protocol data unit (PDU) session identifier (ID), a data network name (DNN), and a request type indication. In some embodiments, the SM message may comprise a procedure transaction identity (PTI) indication identifying a session management transaction (e.g., 5GSM transaction) associated with the SM message.

At step VV104, the wireless device receives a status message (e.g., 5GMM Status message) transmitted by the AMF, wherein the status message comprises at least a portion of the transport message and an indication of non-delivery of the SM message to a SMF. In such an embodiment, the portion of the transport message comprises the SM message. In some embodiments, the indication of non-delivery may comprise a cause of failure to deliver the SM message to a SMF.

In some embodiments, the SM message may be one of: (i) a session establishment request message (e.g., PDU Session Establishment Request message), (ii) a session modification request message (e.g., PDU Session Modification Request message), and (iii) a session release request message (e.g., PDU Session Release Request message). In such an embodiment, the method VV100 may further include the wireless device stopping a timer (e.g., Tx, Tk or Tz) as a result of receiving the indication of non-delivery. In such an embodiment, the method VV100 may further include determining that a session associated with the SM message is: (i) not established, (ii) not modified or (iii) not released.

FIG. VV2 depicts a method VV200, in accordance with particular embodiments, that is performed by an Access and Mobility Management Function (AMF). Method VV200 may begin at step VV202 in which the AMF receives a transport message (e.g., UL SM Message Transport message) transmitted by a wireless device, wherein the transport message comprises a SM message (e.g., 5GSM message). In some embodiments, the SM message may comprise a procedure transaction identity (PTI) indication identifying a session management transaction (e.g., 5GSM transaction) associated with the SM message. In some embodiments, the transport message may further comprise at least one or more of: a protocol data unit (PDU) session identifier (ID), a data network name (DNN), and a request type indication.

At step VV204, the AMF determines, based on the transport message, whether the SM message can be forwarded to a SMF.

In some embodiments, the step VV204 of determining, based on the transport message, whether the SM message can be forwarded to a SMF may further comprise: the AMF determining whether the AMF has a PDU session routing context for the PDU session identifier, wherein the request type indication indicates that the SM message is associated to an initial request; and as a result of determining that the AMF does not have a PDU session routing context for the PDU session identifier, the AMF determining that a SMF cannot be selected for the SM message.

In some embodiments, the step VV204 of determining, based on the transport message, whether the SM message can be forwarded to a SMF may further comprise: the AMF determining whether the AMF has a PDU session routing context for the PDU session identifier, wherein the request type indication indicates that the SM message is associated to an existing PDU session; the AMF obtaining subscription context for the wireless device from a unified data management (UDM), wherein the subscription context comprises at least one or more SMF identifier (ID); and as a result of determining: (i) that the AMF does not have a PDU session routing context for the PDU session identifier and (ii) the at least one or more SMF ID is not associated with the DNN, the AMF determining that a SMF cannot be selected for the SM message.

In some embodiments, the step VV204 of determining, based on the transport message, whether the SM message can be forwarded to a SMF may further comprise: the AMF determining whether the AMF has a PDU session routing context for the PDU session identifier, wherein the request type indication indicates that the SM message is associated to an existing PDU session, and the DNN is not included in the transport message; the AMF obtaining subscription context for the wireless device from a unified data management (UDM), wherein the subscription context comprises at least one or more SMF identifier (ID); and as a result of determining: (i) that the AMF does not have a PDU session routing context for the PDU session identifier and (ii) the at least one or more SMF ID is not associated with a default DNN, the AMF determining that a SMF cannot be selected for the SM message.

In some embodiments, the step VV204 of determining, based on the transport message, whether the SM message can be forwarded to a SMF may further comprise: the AMF determining whether the AMF has a PDU session routing context for the PDU session identifier, wherein the request type indication is not included in the transport message; and as a result of determining that the AMF does not have a PDU session routing context for the PDU session identifier, the AMF determining that a SMF cannot be selected for the SM message.

At step VV206, as a result of determining that the SM message cannot be forwarded to a SMF, the AMF creates a status message (e.g., 5GMM Status message) comprising at least a portion of the transport message and an indication of non-delivery of the SM message to a SMF. In some embodiments, the indication of non-delivery comprises a cause of failure to deliver the SM message to a SMF. In some embodiments, the portion of the transport message comprises the SM message.

At step VV 208, the AMF transmits the status message to the wireless device.

FIG. WW1 illustrates a schematic block diagram of an apparatus WW100 in a wireless network (for example, the wireless network shown in FIG. QQ1). The apparatus may be implemented in a wireless device or network node (e.g., wireless device QQ110 or network node QQ160 shown in FIG. QQ1). Apparatus WW100 is operable to carry out the example method described with reference to FIG. VV1 and possibly any other processes or methods disclosed herein. It is also to be understood that the method of FIG. VV1 is not necessarily carried out solely by apparatus WW100. At least some operations of the method can be performed by one or more other entities.

Virtual Apparatus WW100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitter unit WW102 to transmit a transport message (e.g., UL SM Message Transport message) to an Access and Mobility Function (AMF), wherein the transport message comprises a SM message (e.g., 5GSM message), receiver unit WW104 to receive a status message (e.g., 5GMM Status message) transmitted by the AMF, wherein the status message comprises at least a portion of the transport message and an indication of non-delivery of the SM message to a SMF, and any other suitable units of apparatus WW100 to perform corresponding functions according one or more embodiments of the present disclosure.

As illustrated in FIG. WW1, apparatus WW100 includes a transmitter unit WW102 configured to transmit a transport message (e.g., UL SM Message Transport message) to an Access and Mobility Function (AMF), wherein the transport message comprises a SM message (e.g., 5GSM message), and a receiver unit WW104 configured to receive a status message (e.g., 5GMM Status message) transmitted by the AMF, wherein the status message comprises at least a portion of the transport message and an indication of non-delivery of the SM message to a SMF.

FIG. WW2 illustrates a schematic block diagram of an apparatus WW200 in a wireless network (for example, the wireless network shown in FIG. QQ1). The apparatus may be implemented in a wireless device or network node (e.g., wireless device QQ110 or network node QQ160 shown in FIG. QQ1). Apparatus WW200 is operable to carry out the example method described with reference to FIG. VV2 and possibly any other processes or methods disclosed herein. It is also to be understood that the method of FIG. VV2 is not necessarily carried out solely by apparatus WW200. At least some operations of the method can be performed by one or more other entities.

Virtual Apparatus WW200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiver unit WW202 to receive a transport message (e.g., UL SM Message Transport message) transmitted by a wireless device, wherein the transport message comprises a SM message (e.g., 5GSM message), determining unit WW204 to determine, based on the transport message, whether the SM message can be forwarded to a SMF, creating unit WW206 to create a status message (e.g., 5GMM Status message) comprising at least a portion of the transport message and an indication of non-delivery of the SM message to a SMF as a result of determining that the SM message cannot be forwarded to a SMF, transmitter unit WW208 to transmit the status message to the wireless device, and any other suitable units of apparatus WW200 to perform corresponding functions according one or more embodiments of the present disclosure.

As illustrated in FIG. WW2, apparatus WW200 includes a receiver unit WW202 configured to receive a transport message (e.g., UL SM Message Transport message) transmitted by a wireless device, wherein the transport message comprises a SM message (e.g., 5GSM message), a determining unit WW204 configured to determine, based on the transport message, whether the SM message can be forwarded to a SMF, a creating unit WW206 to create a status message (e.g., 5GMM Status message) comprising at least a portion of the transport message and an indication of non-delivery of the SM message to a SMF as a result of determining that the SM message cannot be forwarded to a SMF, and a transmitter unit WW208 configured to transmit the status message to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments—UE

A1. A method implemented in a wireless device, comprising:
transmitting a transport message (e.g., UL SM Message Transport message) to an Access and Mobility Function (AMF), wherein the transport message comprises a SM message (e.g., 5GSM message); and
receiving a status message (e.g., 5GMM Status message) transmitted by the AMF, wherein the status message comprises at least a portion of the transport message and an indication of non-delivery of the SM message to a SMF.

A2. The method of A1, wherein the portion of the transport message comprises the SM message.

A3. The method of A1 or A2, wherein the transport message further comprises at least one or more of: a protocol data unit (PDU) session identifier (ID), a data network name (DNN), and a request type indication.

A4. The method of any one of A1-A3, wherein the SM message comprises a procedure transaction identity (PTI) indication identifying a session management transaction (e.g., 5GSM transaction) associated with the SM message.

A5. The method of any one of A1-A4, wherein the SM message is one of: (i) a session establishment request message (e.g., PDU Session Establishment Request message), (ii) a session modification request message (e.g., PDU Session Modification Request message), and (iii) a session release request message (e.g., PDU Session Release Request message), the method further comprising:
as a result of receiving the indication of non-delivery, stopping a timer (e.g., Tx, Tk or Tz).

A6. The method of A5, the method further comprising:
as a result of receiving the indication of non-delivery, determining that a session associated with the SM message is: (i) not established, (ii) not modified or (iii) not released.

A7. The method of any one of A1-A6, wherein the indication of non-delivery comprises a cause of failure to deliver the SM message to a SMF.

A8. The method of any of the previous embodiments, further comprising:
providing user data; and
forwarding the user data to a host computer via the transmission to the base station.

Group B Embodiments—Base Station

B1. A method performed by an Access and Mobility Management Function (AMF), comprising:
receiving a transport message (e.g., UL SM Message Transport message) transmitted by a wireless device, wherein the transport message comprises a SM message (e.g., 5GSM message);
determining, based on the transport message, whether the SM message can be forwarded to a SMF;
as a result of determining that the SM message cannot be forwarded to a SMF, creating a status message (e.g., 5GMM Status message) comprising at least a portion of the transport message and an indication of non-delivery of the SM message to a SMF; and
transmitting the status message to the wireless device.

B2. The method of B1, wherein the portion of the transport message comprises the SM message.

B3. The method of B1 or B2, wherein the SM message comprises a procedure transaction identity (PTI) indication identifying a session management transaction (e.g., 5GSM transaction) associated with the SM message.

B4. The method of any one of B1-B3, wherein the transport message further comprises at least one or more of: a protocol data unit (PDU) session identifier (ID), a data network name (DNN), and a request type indication.

B5. The method of B4, wherein the determining, based on the transport message, whether the SM message can be forwarded to a SMF further comprises:
determining whether the AMF has a PDU session routing context for the PDU session identifier, wherein the request type indication indicates that the SM message is associated to an initial request; and
as a result of determining that the AMF does not have a PDU session routing context for the PDU session identifier, determining that a SMF cannot be selected for the SM message.

B6. The method of B4, wherein the determining, based on the transport message, whether the SM message can be forwarded to a SMF further comprises:

determining whether the AMF has a PDU session routing context for the PDU session identifier, wherein the request type indication indicates that the SM message is associated to an existing PDU session;

obtaining subscription context for the wireless device from a unified data management (UDM), wherein the subscription context comprises at least one or more SMF identifier (ID); and as a result of determining: (i) that the AMF does not have a PDU session routing context for the PDU session identifier and (ii) the at least one or more SMF ID is not associated with the DNN, determining that a SMF cannot be selected for the SM message.

B7. The method of B4, wherein the determining, based on the transport message, whether the SM message can be forwarded to a SMF further comprises:

determining whether the AMF has a PDU session routing context for the PDU session identifier, wherein the request type indication indicates that the SM message is associated to an existing PDU session, and the DNN is not included in the transport message;

obtaining subscription context for the wireless device from a unified data management (UDM), wherein the subscription context comprises at least one or more SMF identifier (ID); and as a result of determining: (i) that the AMF does not have a PDU session routing context for the PDU session identifier and (ii) the at least one or more SMF ID is not associated with a default DNN, determining that a SMF cannot be selected for the SM message.

B8. The method of B4, wherein the determining, based on the transport message, whether the SM message can be forwarded to a SMF further comprises:

determining whether the AMF has a PDU session routing context for the PDU session identifier, wherein the request type indication is not included in the transport message; and as a result of determining that the AMF does not have a PDU session routing context for the PDU session identifier, determining that a SMF cannot be selected for the SM message.

B9. The method of any one of B1-B8, wherein the indication of non-delivery comprises a cause of failure to deliver the SM message to a SMF.

B10. The method of any of the previous embodiments, further comprising:

obtaining user data; and forwarding the user data to a host computer or a wireless device.

Group C Embodiments

C1. A wireless device comprising:

processing circuitry configured to perform any of the steps of any of the Group A embodiments; and power supply circuitry configured to supply power to the wireless device.

C2. A base station, the base station comprising:

processing circuitry configured to perform any of the steps of any of the Group B embodiments;

power supply circuitry configured to supply power to the wireless device.

C3. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C4. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein:

the processing circuitry of the host computer is configured to execute a host application, thereby providing the user data; and the UE comprises processing circuitry configured to execute a client application associated with the host application.

C8. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein:

the processing circuitry of the host computer is configured to execute a host application, thereby providing the user data; and the UE's processing circuitry is configured to execute a client application associated with the host application.

C15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein:

the processing circuitry of the host computer is configured to execute a host application; and the UE's processing circuitry is configured to execute a client application associated with the host application, thereby providing the user data.

C21. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

C22. A method implemented in a communication system including a host computer, a base station and a user equipment (UE), the method comprising:

at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising:

at the UE, executing a client application, thereby providing the user data to be transmitted; and at the host computer, executing a host application associated with the client application.

C25. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein:

the processing circuitry of the host computer is configured to execute a host application;

the UE is configured to execute a client application associated with the host application, thereby providing the user data to be received by the host computer.

C30. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

While various embodiments of the present disclosure are described herein (including the attached appendix), it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

APPENDIX

2. Reason for Change
2.1 Problem Description
TR 24.890 contains the following editor's notes:
8.5.1.1.2.1.1.4 Abnormal cases on the network side
--------------
The following abnormal cases in AMF are identified:
  a) the AMF does not have a PDU session routing context for the PDU session ID of the UL SM MESSAGE TRANSPORT message and the UE, the request type IE of the UL SM MESSAGE TRANSPORT message is set to "initial request", and the SMF selection fails.
  Editor's note: Handling of this abnormal case is FFS
. . .
  b) the AMF does not have a PDU session routing context for the PDU session ID of the UL SM MESSAGE TRANSPORT message and the UE, the request type IE of the UL SM MESSAGE TRANSPORT message is set to "existing PDU session", and the user's subscription context obtained from the UDM does not contain an SMF ID corresponding to.
    1) the DNN of the UL SM MESSAGE TRANSPORT message, if the DNN is included in the NAS SM MESSAGE TRANSPORT message; or
    2) the default DNN, if the DNN is not included in the UL SM MESSAGE TRANSPORT message.
  Editor's note: Handling of this abnormal case is FFS
--------------
Similar error can also occur when request type is not provided by the UE.
If no handling is defined for the cases above, the failure is due to a permanent cause (e.g. the requested DNN is not authorized DNN for the UE) and the SM messages are retransmitted, then the UE will retransmit the SM message in a new UL SM MESSAGE TRANSPORT message and the AMF needs to repeat the SMF selection again with the same failure.
2.2 Possible Solutions
2.2.1 Alternative-1
UE-initiated NAS transport procedure is extended with an UL SM MESSAGE TRANSPORT ACCEPT message or an UL SM MESSAGE TRANSPORT REJECT message, which AMF sends upon reception and handling of UL SM MESSAGE TRANSPORT REQUEST message. Only up to one UE-initiated NAS transport procedure would be run at any given time.
If the AMF is able to forward 5GSM message of UL SM MESSAGE TRANSPORT REQUEST message, the AMF sends UL SM MESSAGE TRANSPORT ACCEPT message.
If the AMF is unable to forward 5GSM message of UL SM MESSAGE TRANSPORT REQUEST message, the AMF sends UL SM MESSAGE TRANSPORT REJECT message. The UL SM MESSAGE TRANSPORT REJECT message contains a cause.
As reliability is provided on SM transport layer, the 5GSM procedures will not need to retransmit 5GSM messages.
If transport of 5GSM message fails, the 5GSM procedure will consider the 5GSM procedure as unsuccessfully completed.
2.2.2 Alternative-2
If the AMF is unable to forward 5GSM message of UL SM MESSAGE TRANSPORT message, the AMF sends 5GMM STATUS message. The 5GMM STATUS message contains a 5GMM message container IE containing the UL SM MESSAGE TRANSPORT message, and a cause.
If the UE receives a 5GMM STATUS message with 5GMM message container IE containing the UL SM MESSAGE TRANSPORT message containing a 5GSM message, the 5GMM layer informs the 5GSM layer about non-delivery of the 5GSM message.
Based on non-delivery of the 5GSM message, the 5GSM procedure will stop any retransmissions of the 5GSM message and consider the 5GSM procedure as unsuccessfully completed.
2.2.3 Alternative-3
AMF is configured with a SMF for rejection.
AMF routes any SM message which is unable to route forward to the SMF for rejection. The SMF rejects the 5GSM request message with appropriate 5GSM response message.
2.2.4 Alternative-4
Do nothing and live with retransmissions in case of AMF not being able to select an SMF.
2.3 Evaluation
Alternative-1 requires two NAS messages to transport a 5G SM message while the existing procedure requires only 1 NAS message.
Alternative-3 requires deployment of an SMF. The SMF does not need to be fully functional—it only needs to be able to reject the 5GSM message from the UE.
Alternative-4 does not solve the problem.
4. Proposal
It is proposed to apply alternative-2.
It is proposed to agree the following changes to 3GPP TR 24.890.
8.5.1.1.2.1.1.4 Abnormal cases on the network side
The following abnormal cases in AMF are identified:
  a) if the AMF does not have a PDU session routing context for the PDU session ID of the UL SM MESSAGE TRANSPORT message and the UE, the request type IE of the UL SM MESSAGE TRANSPORT message is set to "initial request", and the SMF selection fails, then the AMF shall create a 5GMM STATUS message. The AMF shall set the 5GMM message container IE of the 5GMM STATUS message to the UL SM MESSAGE TRANSPORT message. The AMF shall set the cause IE of the 5GMM STATUS message to a cause indicating cause of failure. The AMF shall send the 5GMM STATUS message to the UE.
  b) if the AMF does not have a PDU session routing context for the PDU session ID of the UL SM MESSAGE TRANSPORT message and the UE, the request type IE of the UL SM MESSAGE TRANSPORT message is set to "existing PDU session", and the user's subscription context obtained from the UDM does not contain an SMF ID corresponding to:
    1) the DNN of the UL SM MESSAGE TRANSPORT message, if the DNN is included in the NAS SM MESSAGE TRANSPORT message; or
    2) the default DNN, if the DNN is not included in the UL SM MESSAGE TRANSPORT message.
    then the AMF shall create a 5GMM STATUS message. The AMF shall set the 5GMM message container IE of the 5GMM STATUS message to the UL SM MESSAGE TRANSPORT message. The AMF shall set the cause IE of the 5GMM STATUS message to a cause indicating cause of failure. The AMF shall send the 5GMM STATUS message to the UE.
  c) if the AMF does not have a PDU session routing context for the PDU session ID of the UL SM MESSAGE TRANSPORT message and the UE, and the request type IE of the UL SM MESSAGE TRANS- PORT message is not provided, then the AMF shall create a 5GMM STATUS message. The AMF shall set the 5GMM message container IE of the 5GMM STATUS message to the UL SM MESSAGE TRANSPORT message. The AMF shall set the cause IE of the 5GMM STATUS message to a cause indicating cause of failure. The AMF shall send the 5GMM STATUS message to the UE.

d) if the AMF has a PDU session routing context for the PDU session ID of the UL SM MESSAGE TRANSPORT message and the UE, the request type IE of the UL SM MESSAGE TRANSPORT message is set to "initial request" and the AMF has not received a reallocation requested indication, the AMF should forward the SM message, the PDU session ID, the S-NSSAI (if received), the DNN (if received) and the request type of the UL SM MESSAGE TRANSPORT message towards the SMF ID of the PDU session routing context.

e) if the AMF has a PDU session routing context for the PDU session ID of the UL SM MESSAGE TRANSPORT message and the UE, the PDU session routing context indicates that the PDU session is an emergency PDU session, the request type IE of the UL SM MESSAGE TRANSPORT message is set to "initial emergency request", the AMF should forward the SM message, the PDU session ID, the S-NSSAI (if received), the DNN (if received) and the request type of the UL SM MESSAGE TRANSPORT message towards the SMF ID of the PDU session routing context.

f) if the AMF has a PDU session routing context for the PDU session ID of the UL SM MESSAGE TRANSPORT message and the UE, the request type IE of the UL SM MESSAGE TRANSPORT message is set to "initial request", the AMF has received a reallocation requested indication from the SMF indicating that the SMF is to be reallocated, and the PDU session routing context contains reallocated SMF ID, the AMF should forward the SM message, the PDU session ID, the S-NSSAI (if received), the DNN (if received) and the request type of the UL SM MESSAGE TRANSPORT message towards the reallocated SMF ID of the PDU session routing context.

8.5.1.1.2.1.1.5 UE-initiated SM message transport initiation not accepted by the network Upon reception of 5GMM STATUS message with the 5GMM message container IE containing an UL SM MESSAGE TRANSPORT message, the UE passes a non-delivery indication along with the SM message of the UL SM MESSAGE TRANSPORT message to the 5GSM procedures specified in clause 9.

9.4.2.5 Abnormal cases in the UE

The following abnormal cases can be identified:
  a) Tx expired
  Editor's note: Further abnormal cases in the UE are FFS.
  b) Upon receiving a non-delivery indication along with a PDU SESSION ESTABLISHMENT REQUEST message with PTI IE set to the allocated PTI value, the UE shall stop timer Tx, shall release the allocated PTI value and shall consider that the PDU session is not established.

9.4.4.5 Abnormal cases in the UE

The following abnormal cases can be identified:
  a) Tk expired
  Editor's note: Further abnormal cases are FFS.
  b) Upon receiving a non-delivery indication along with a PDU SESSION MODIFICATION REQUEST message with PTI IE set to the allocated PTI value, the UE shall stop timer Tk, shall release the allocated PTI value and shall consider that the PDU session is not modified.

9.4.6.5 Abnormal cases in the UE

The following abnormal cases can be identified:
  a) Tz expired
  Editors' note: Further abnormal cases are FFS.
  b) Upon receiving a non-delivery indication along with a PDU SESSION RELEASE REQUEST message with PTI IE set to the allocated PTI value, the UE shall stop timer Tz, shall release the allocated PTI value and shall consider that the PDU session is not released.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGIEvolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method implemented in a wireless device, the method comprising:
- transmitting an uplink (UL) transport message to an Access and Mobility Function (AMF), wherein the UL transport message comprises: i) a first information element (IE) containing a packet data unit (PDU) session identity (ID) and ii) a second IE containing a 5G session management (5GSM) message to be forwarded by the AMF to a Session Management Function (SMF); and
- after transmitting the UL transport message to the AMF, receiving a message transmitted by the AMF, wherein the message transmitted by the AMF comprises: i) a container IE containing said 5GSM message that was contained in the UL transport message and ii) a cause IE containing information indicating non-delivery of the 5GSM message.

2. The method of claim 1, wherein
the 5GSM message is a PDU SESSION ESTABLISHMENT REQUEST message or a PDU SESSION MODIFICATION REQUEST message.

3. The method of claim 2, wherein
the UL transport message further comprises a request type IE containing a type value identifying a 5GSM message type.

4. The method of claim 1, wherein
the message transmitted by the AMF further comprises a PDU session ID IE containing the PDU session ID.

5. The method of claim 1, wherein
the 5GSM message is a PDU SESSION ESTABLISHMENT REQUEST, and
the UL transport message further comprises a request type IE containing a type value set to initial request.

6. The method of claim 5, the method further comprising:
as a result of receiving the indication of non-delivery, stopping a timer and determining that a session associated with the 5GSM message is: (i) not established, (ii) not modified, or (iii) not released.

7. The method of claim 1, wherein the indication of non-delivery comprises a cause of failure indication.

8. A wireless device, the wireless device comprising:
a receiver;
a transmitter; and
processing circuitry coupled to the receiver and the transmitter, wherein the wireless device is configured to:
transmit an uplink (UL) transport message to a Access and Mobility Function (AMF), wherein the UL transport message comprises: i) a first information element (IE) containing a packet data unit (PDU) session identity (ID) and ii) a second IE containing a 5G session management (5GSM) message to be forwarded by the AMF to a Session Management Function (SMF); and after transmitting the UL transport message, receive a message transmitted by the AMF, wherein the message comprises: i) a container IE containing said 5GSM message that was contained in the UL transport message and ii) a cause IE containing information indicating non-delivery of the 5GSM message.

9. A method performed by a 3GPP Access and Mobility Management Function (AMF), comprising:

receiving an uplink (UL) transport message transmitted by a user equipment (UE), wherein the UL transport message comprises: i) a first information element (IE) containing a packet data unit (PDU) session identity (ID) and ii) a second IE containing a 5G session management (5GSM) message to be forwarded by the AMF to a Session Management Function (SMF);

determining whether the 5GSM message can be forwarded to a Session Management Function (SMF);

as a result of determining that the 5GSM cannot be forwarded to a SMF, transmitting to the UE a message comprising: i) a container IE containing said 5GSM message that was contained in the UL transport message and ii) a cause IE containing information indicating non-delivery of the 5GSM message.

10. The method of claim 9, wherein the message transmitted to the UE further comprises a PDU session ID IE containing the PDU session ID.

11. The method of claim 9, wherein the 5GSM message is a PDU SESSION ESTABLISHMENT REQUEST message or a PDU SESSION MODIFICATION REQUEST message.

12. The method of claim 9, wherein the 5GSM message comprises a procedure transaction identity indication identifying a session management transaction.

13. The method of claim 9, wherein the UL transport message further comprises a request type IE containing a type value identifying a 5GSM message type.

14. The method of claim 13, wherein the determining whether the 5GSM message can be forwarded to a SMF comprises:

determining whether the AMF has a PDU session routing context for the PDU session identity, wherein the request type IE indicates that the 5GSM message is associated to an initial request; and as a result of determining that the AMF does not have a PDU session routing context for the PDU session identity, determining that a SMF cannot be selected for the 5GSM message.

15. The method of claim 10, wherein the determining whether the 5GSM message can be forwarded to a SMF comprises:

determining whether the AMF has a PDU session routing context for the PDU session identity, wherein the request type IE indicates that the 5GSM message is associated to an existing PDU session;

obtaining subscription context for the UE from a unified data management (UDM), wherein the subscription context comprises a SMF identifier (ID); and after determining: (i) that the AMF does not have a PDU session routing context for the PDU session identity and (ii) that the SMF ID is not associated with the DNN, determining that a SMF cannot be selected for the 5GSM message.

16. The method of claim 13, wherein the determining whether the 5GSM message can be forwarded to a SMF comprises:

determining whether the AMF has a PDU session routing context for the PDU session identity, wherein the request type IE indicates that the 5GSM message is associated to an existing PDU session, and the DNN is not included in the UL transport message;

obtaining subscription context for the UE from a unified data management, UDM, wherein the subscription context comprises a SMF identifier (ID); and after determining: (i) that the AMF does not have a PDU session routing context for the PDU session identity and (ii) that the SMF ID is not associated with a default DNN, determining that a SMF cannot be selected for the 5GSM message.

17. The method of claim 13, wherein the determining whether the 5GSM message can be forwarded to a SMF comprises:

determining whether the AMF has a PDU session routing context for the PDU session identity, wherein the request type IE is not included in the UL transport message; and after determining that the AMF does not have a PDU session routing context for the PDU session identity, determining that a SMF cannot be selected for the 5GSM message.

18. The method of claim 9, wherein the 5GSM message is a PDU SESSION ESTABLISHMENT REQUEST, and the UL transport message further comprises a request type IE containing a type value set to initial request.

19. The method of claim 9, further comprising:

obtaining user data; and forwarding the user data to a host computer or a wireless device.

20. A 3GPP Access and Mobility Management Function (AMF) entity configured to perform the method of claim 9.

21. The AMF entity of claim 20, wherein the determining whether 5GSM message can be forwarded to a SMF is at least partly based on the UL transport message.

* * * * *

UNITED STATES PATENT AND TRADEMARK OFFICE
CERTIFICATE OF CORRECTION

PATENT NO. : 11,368,254 B2
APPLICATION NO. : 16/756209
DATED : June 21, 2022
INVENTOR(S) : Sedlacek et al.

It is certified that error appears in the above-identified patent and that said Letters Patent is hereby corrected as shown below:

On the Title Page

In Item (72), under "Inventors", in Column 1, Line 1, delete "Hovorcovice (CZ);" and insert
-- Hovorčovice (CZ); --, therefor.

On Page 2, in Item (56), under "OTHER PUBLICATIONS", in Column 1, Line 10, delete
""TS23.,502:" and insert -- "TS23.502: --, therefor.

On Page 2, in Item (56), under "OTHER PUBLICATIONS", in Column 2, Line 13, delete "Meeting
122B," and insert -- Meeting #122bis, --, therefor.

In the Drawings

Figure 2:
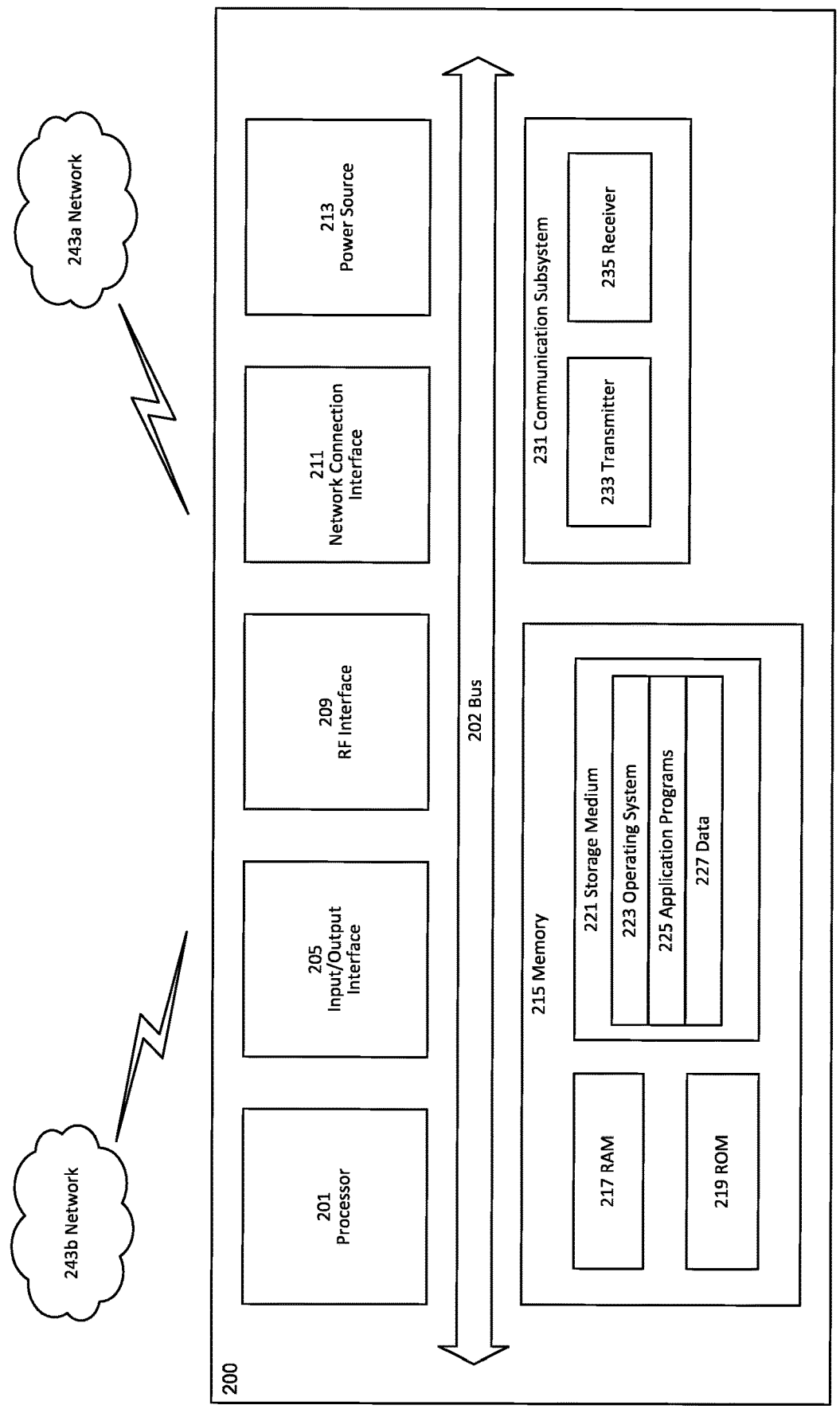
Figure 3:
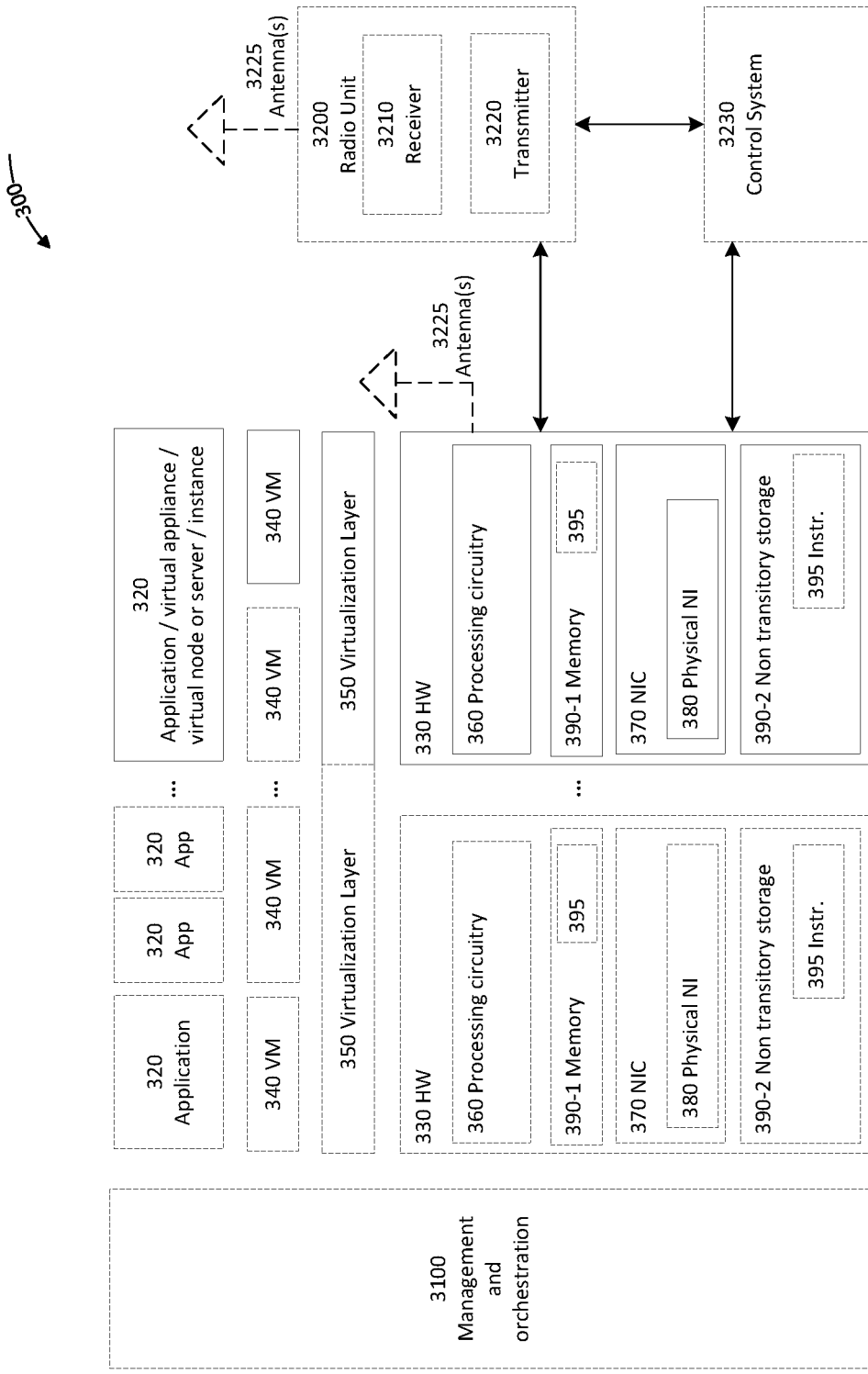
Figure 4:
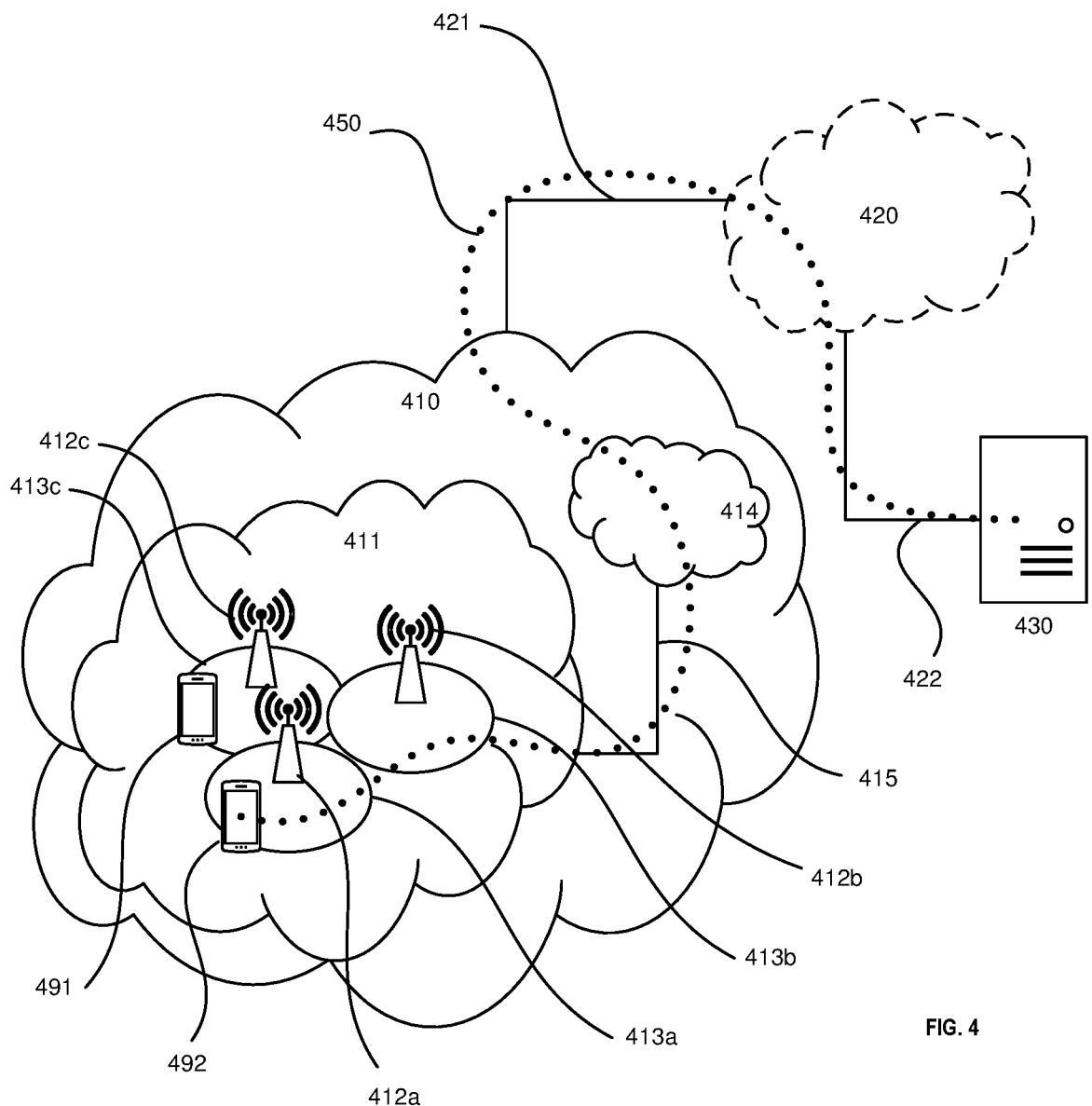
Figure 5:
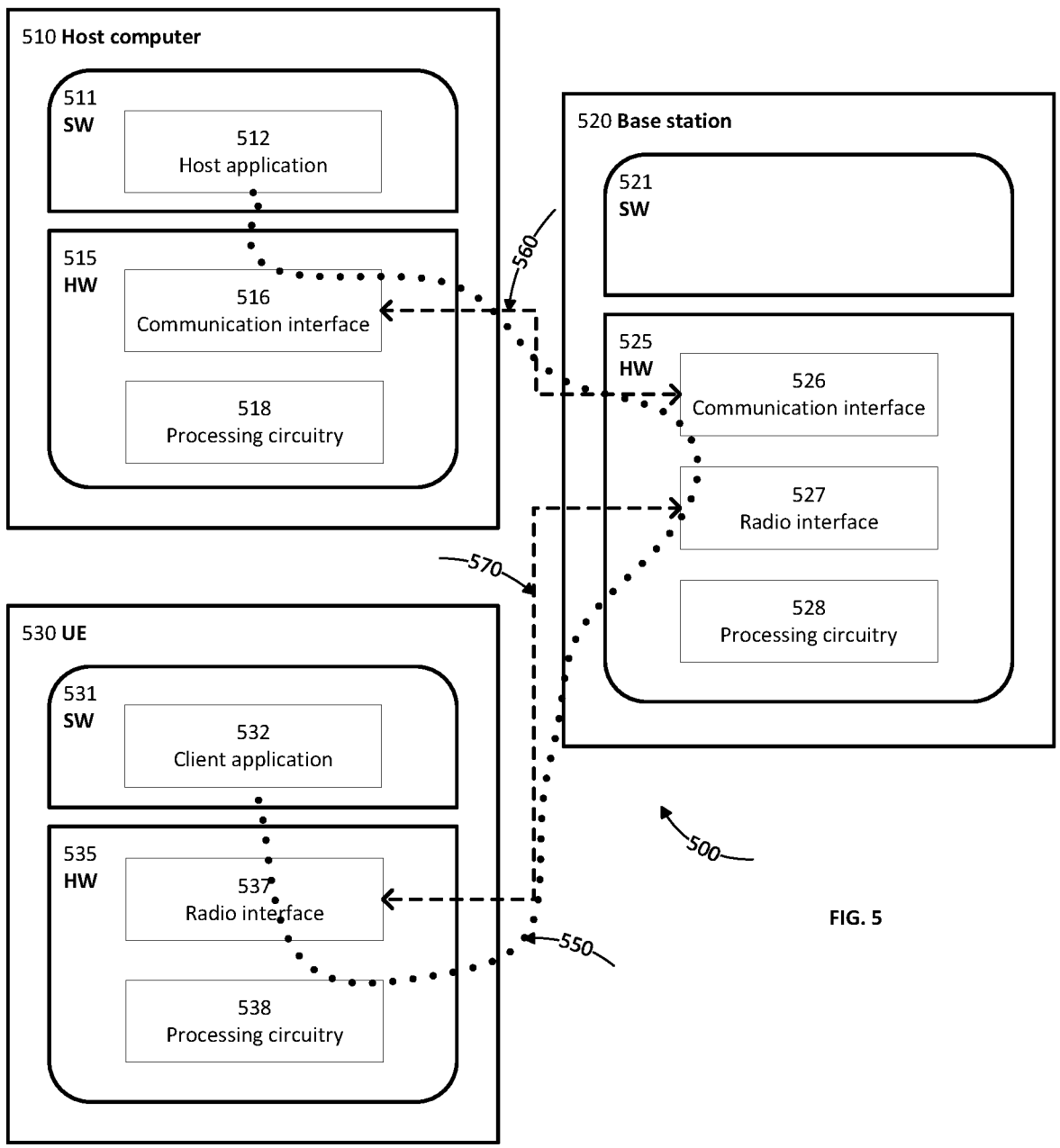
Figure 6:
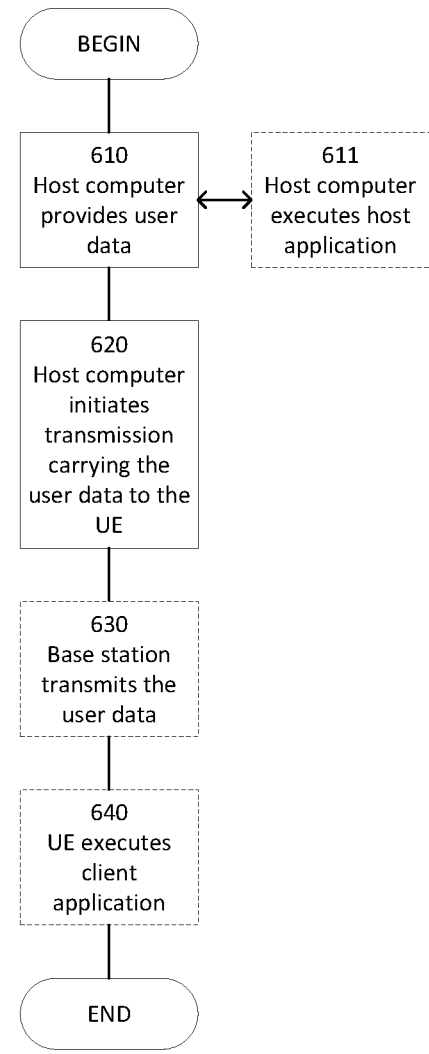
Figure 7:
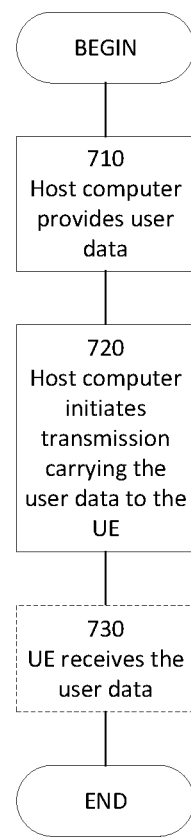
Figure 8:
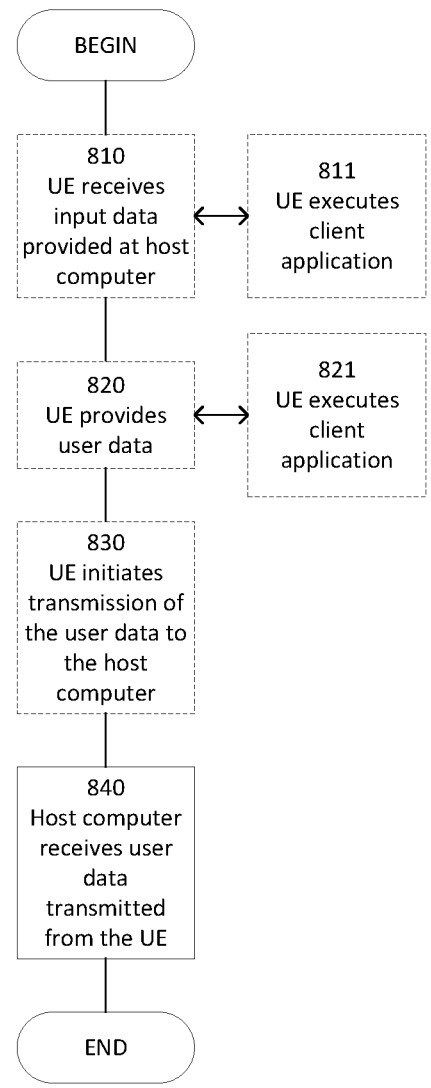
Figure 9:
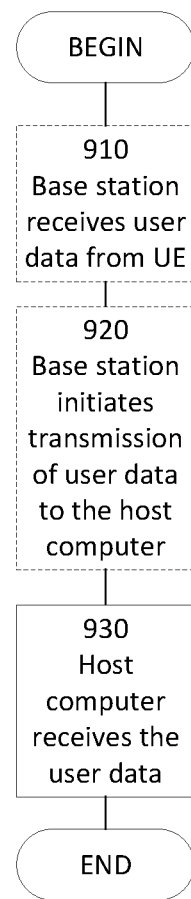
Figure 10:
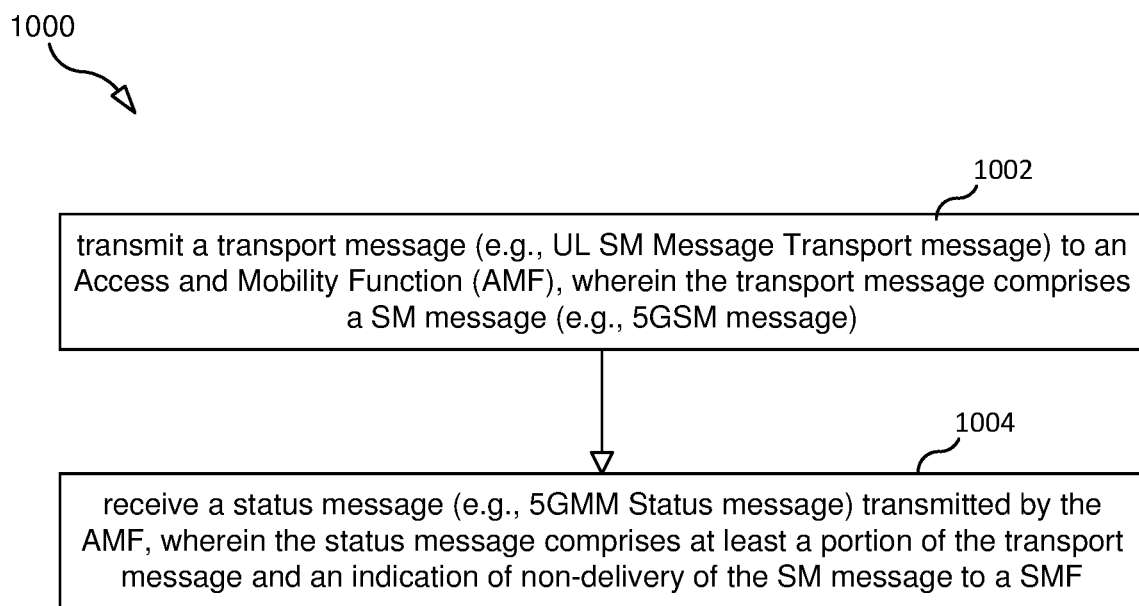
Figure 11:
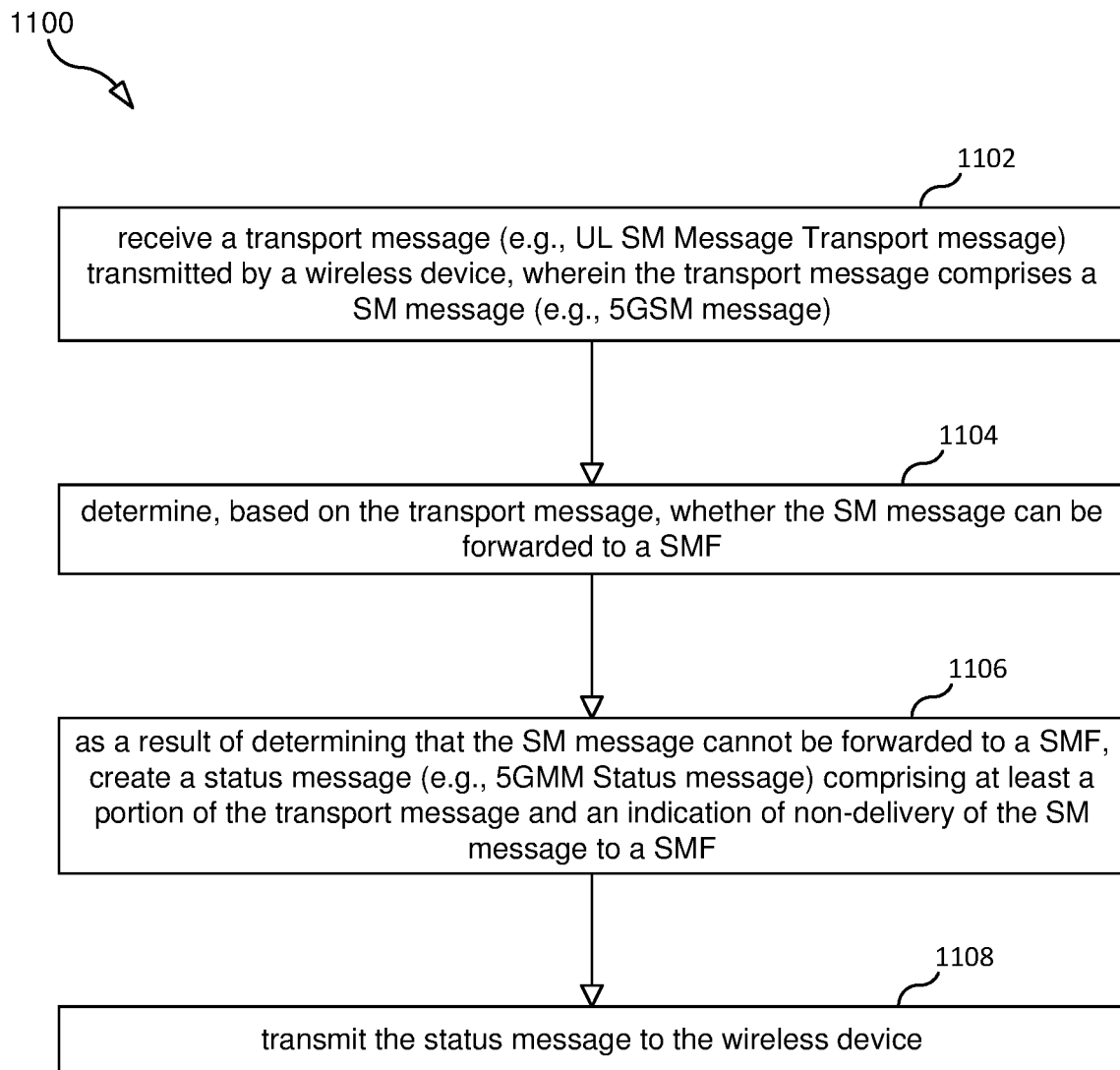
Figure 12:
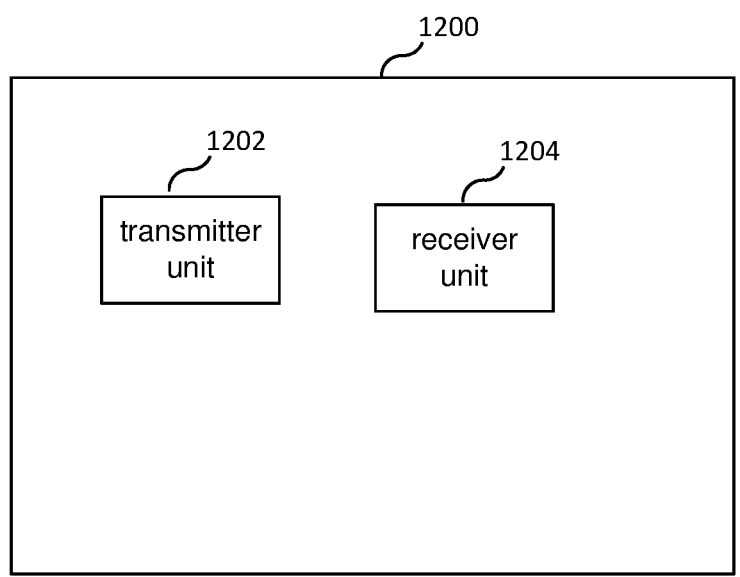
Figure 13:
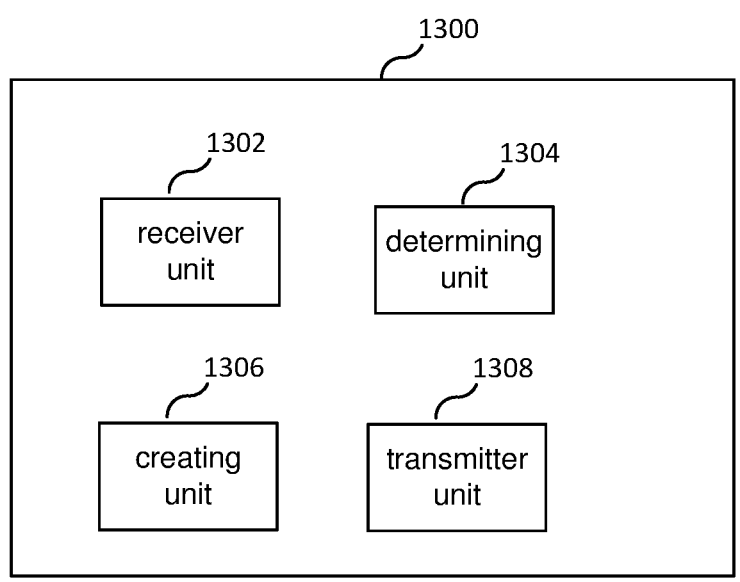

In Fig. 2, Sheet 2 of 13, for Tag "201", Line 1, delete "Processor" and insert -- Processing Circuitry --,
therefor.

In the Specification

In Column 8, Line 22, delete "NodeB's." and insert -- NodeBs. --, therefor.

In Column 8, Line 64, delete "(SOC)." and insert -- (SoC). --, therefor.

In Column 9, Line 7, delete "units" and insert -- units. --, therefor.

In Column 10, Line 15, delete "considered a" and insert -- considered as a --, therefor.

In Column 10, Line 25, delete "QQ190 and" and insert -- 192 and --, therefor.

In Column 11, Line 43, delete "(CPE). a" and insert -- (CPE), a --, therefor.

Signed and Sealed this
Eighteenth Day of October, 2022

Katherine Kelly Vidal
*Director of the United States Patent and Trademark Office*

CERTIFICATE OF CORRECTION (continued)
U.S. Pat. No. 11,368,254 B2

In Column 12, Line 28, delete "considered an" and insert -- considered as an --, therefor.

In Column 12, Line 32, delete "Radio front end circuitry QQ114" and insert -- Radio front end circuitry 112 --, therefor.

In Column 12, Line 42, delete "considered a" and insert -- considered as a --, therefor.

In Column 13, Line 9, delete "SOC." and insert -- SoC. --, therefor.

In Column 14, Lines 26-27, delete "proximity or" and insert -- proximity sensor or --, therefor.

In Column 15, Line 15, delete "UE QQ2200" and insert -- UE 200 --, therefor.

In Column 15, Lines 24-25, delete "interchangeable." and insert -- interchangeably. --, therefor.

In Column 15, Line 34, delete "power source QQ233," and insert -- power source 213, --, therefor.

In Column 16, Line 60, delete "data file QQ227." and insert -- data 227. --, therefor.

In Column 17, Lines 1-2, delete "high-density digital versatile disc (HD-DVD)" and insert -- high-definition digital versatile disc (HD-DVD) --, therefor.

In Column 17, Lines 7-8, delete "subscriber identity module or a removable user identity (SIM/RUIM) module," and insert -- subscriber identity module or a removable user identity module (SIM/RUIM), --, therefor.

In Column 17, Line 30, delete "IEEE 802.QQ2," and insert -- IEEE 802.2, --, therefor.

In Column 18, Line 43, delete "memory QQ390. Memory QQ390" and insert -- memory 390-1. Memory 390-1 --, therefor.

In Column 19, Line 30, delete "onto" and insert -- into --, therefor.

In Column 22, Line 52, delete "etc.; the" and insert -- etc. the --, therefor.

In Column 22, Line 59, delete "in that" and insert -- such that --, therefor.

In Column 23, Line 50, delete "in substep" and insert -- in step --, therefor.

In Column 24, Line 10, delete "microprocessor" and insert -- microprocessors --, therefor.

In Column 24, Line 24, delete "according one" and insert -- according to one --, therefor.

In Column 24, Lines 44-45, delete "an embodiments," and insert -- an embodiment, --, therefor.

In Column 26, Line 19, delete "microprocessor" and insert -- microprocessors --, therefor.

CERTIFICATE OF CORRECTION (continued)
U.S. Pat. No. 11,368,254 B2

In Column 26, Line 42, delete "according one" and insert -- according to one --, therefor.

In Column 26, Line 67, delete "microprocessor" and insert -- microprocessors --, therefor.

In Column 27, Line 27, delete "according one" and insert -- according to one --, therefor.

In Column 30, Line 26, delete "pervious" and insert -- previous --, therefor.

In Column 30, Line 27, delete "including" and insert -- includes --, therefor.

In Column 30, Lines 57-58, delete "performs the of the previous" and insert -- perform any of the steps of any of the previous --, therefor.

In Column 33, Line 23, delete "corresponding to." and insert -- corresponding to: --, therefor.

In Column 34, Lines 20-21, delete "5G SM" and insert -- 5GSM --, therefor.

In Column 34, Line 56, delete "message." and insert -- message, --, therefor.

In Column 36, Line 23, delete "an inconsistency" and insert -- any inconsistency --, therefor.

In Column 36, Line 38, delete "CDMA Code Division Multiplexing Access" and insert -- CDMA Code Division Multiple Access --, therefor.

In Column 36, Line 39, delete "CGI Cell Global Identifier" and insert -- CGI Cell Global Identity --, therefor.

In Column 36, Line 57, delete "E-SMLC Evolved-Serving Mobile Location Centre".

In Column 36, Line 58, delete "ECGIEvolved CGI" and insert -- ECGI Evolved CGI --, therefor.

In Column 36, Line 61, delete "E-SMLC evolved Serving Mobile Location Center" and insert -- E-SMLC Enhanced Serving Mobile Location Center --, therefor.

In Column 37, Line 32, delete "PDP Profile Delay Profile" and insert -- PDP Power Delay Profile --, therefor.

In Column 37, Line 37, delete "PMI Precoder Matrix Indicator" and insert -- PMI Precoding Matrix Indicator --, therefor.

In Column 37, Line 47, delete "RLM Radio Link Management" and insert -- RLM Radio Link Monitoring --, therefor.

In Column 38, Line 1, delete "SON Self Optimized Network" and insert -- SON Self-Organizing Network --, therefor.

CERTIFICATE OF CORRECTION (continued)
U.S. Pat. No. 11,368,254 B2

In Column 38, Line 11, delete "UMTS Universal Mobile Telecommunication System" and insert -- UMTS Universal Mobile Telecommunications System --, therefor.

In Column 38, Line 16, delete "WCDMA Wide CDMA" and insert -- WCDMA Wideband CDMA --, therefor.

In Column 38, Line 17, delete "WLAN Wide Local Area Network" and insert -- WLAN Wireless Local Area Network --, therefor.

In the Claims

In Column 39, Line 21, in Claim 9, delete "a Session Management Function" and insert -- the Session Management Function --, therefor.

In Column 40, Line 51, in Claim 21, delete "whether 5GSM" and insert -- whether the 5GSM --, therefor.